United States Patent
Kawasaki et al.

[11] Patent Number: 5,133,122
[45] Date of Patent: Jul. 28, 1992

[54] METHOD OF MANUFACTURING CERAMIC TURBO CHARGER ROTOR

[75] Inventors: Kiyonori Kawasaki, Gifu; Takeyuki Mizuno, Toyohashi; Hiroyuki Kawase, Nagoya, all of Japan

[73] Assignee: NGK Insulators, Ltd., Japan

[21] Appl. No.: 635,981

[22] Filed: Dec. 31, 1990

[30] Foreign Application Priority Data

Jan. 10, 1990 [JP] Japan ................... 2-1559

[51] Int. Cl.⁵ .............................. B22F 7/02
[52] U.S. Cl. ........................ 29/889.2; 417/407
[58] Field of Search ............ 29/889.2, 428; 417/405, 417/406, 407, 409; 416/241 B, 241 R

[56] References Cited

U.S. PATENT DOCUMENTS

| | | | |
|---|---|---|---|
| 3,612,628 | 10/1971 | Steele . | |
| 4,063,850 | 12/1977 | Hueber et al. | 29/889.2 |
| 4,697,325 | 10/1987 | Kamigato et al. | 29/889.2 |
| 4,719,074 | 1/1988 | Tsuno et al. | 29/889.2 |
| 4,719,075 | 1/1988 | Tsuno et al. | 29/889.2 |
| 4,749,334 | 6/1988 | Byrne | 416/241 B |
| 4,984,927 | 1/1991 | Kojima et al. | 416/241 B |
| 4,991,991 | 2/1991 | Ito et al. | 416/241 B |

FOREIGN PATENT DOCUMENTS

| | | |
|---|---|---|
| 3131129 | 2/1983 | Fed. Rep. of Germany . |
| 3531313 | 3/1986 | Fed. Rep. of Germany . |
| 0185541 | 10/1984 | Japan ................... 29/889.2 |
| 2175957A | 5/1986 | United Kingdom . |

Primary Examiner—Irene Cuda
Attorney, Agent, or Firm—Parkhurst, Wendel & Rossi

[57] ABSTRACT

In a method of manufacturing a ceramic turbo charger rotor, wherein an inner race of an angular ball bearing and a spacer are integrally secured to a journal portion of a metal shaft for connecting a ceramic turbine rotor and a metal compressor rotor, the inner race and the spacer are inserted to the journal portion of the metal shaft under a condition such that a tensile load is applied to the metal shaft.

3 Claims, 6 Drawing Sheets

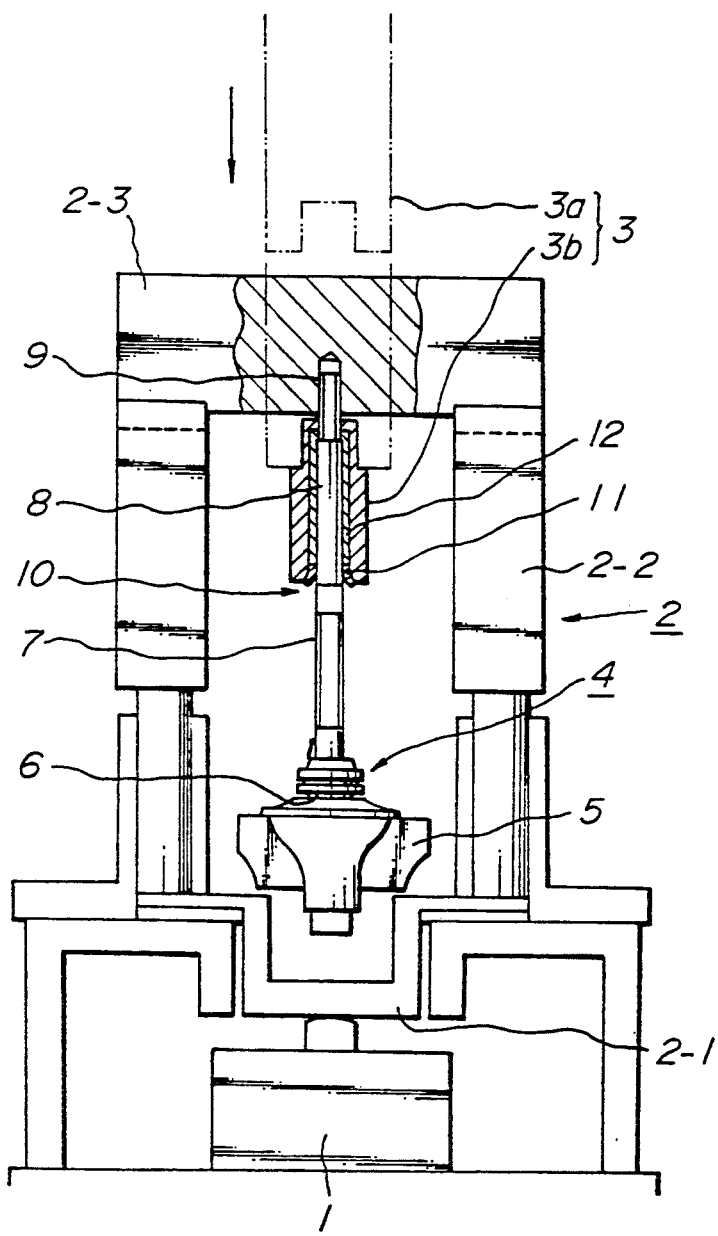
FIG_1a

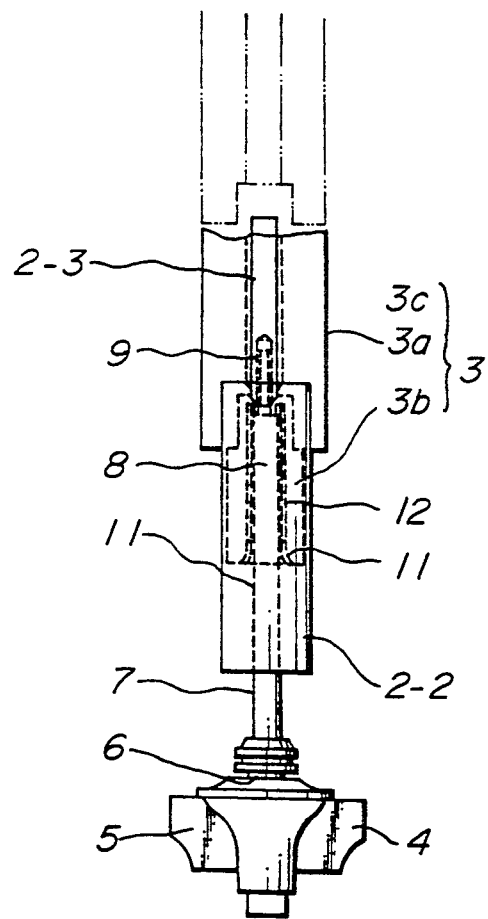
FIG_1b

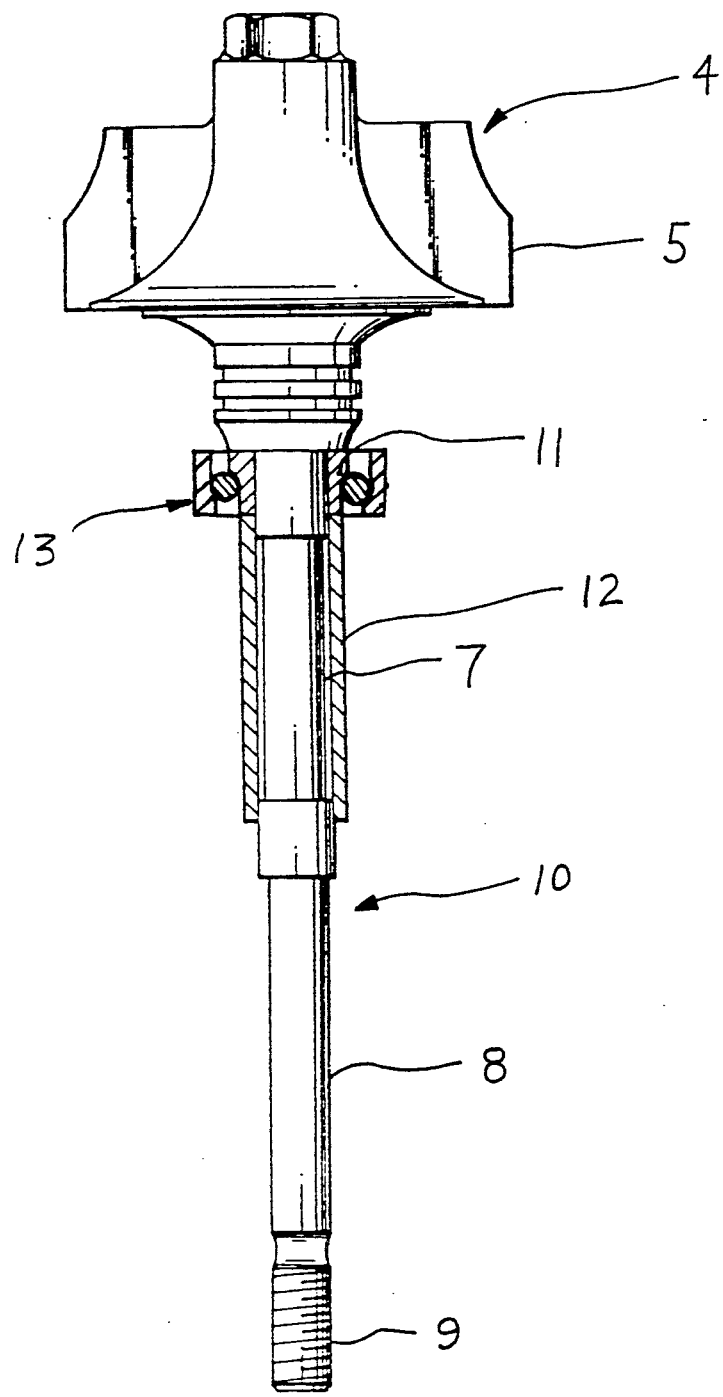
FIG_2a

FIG_2b
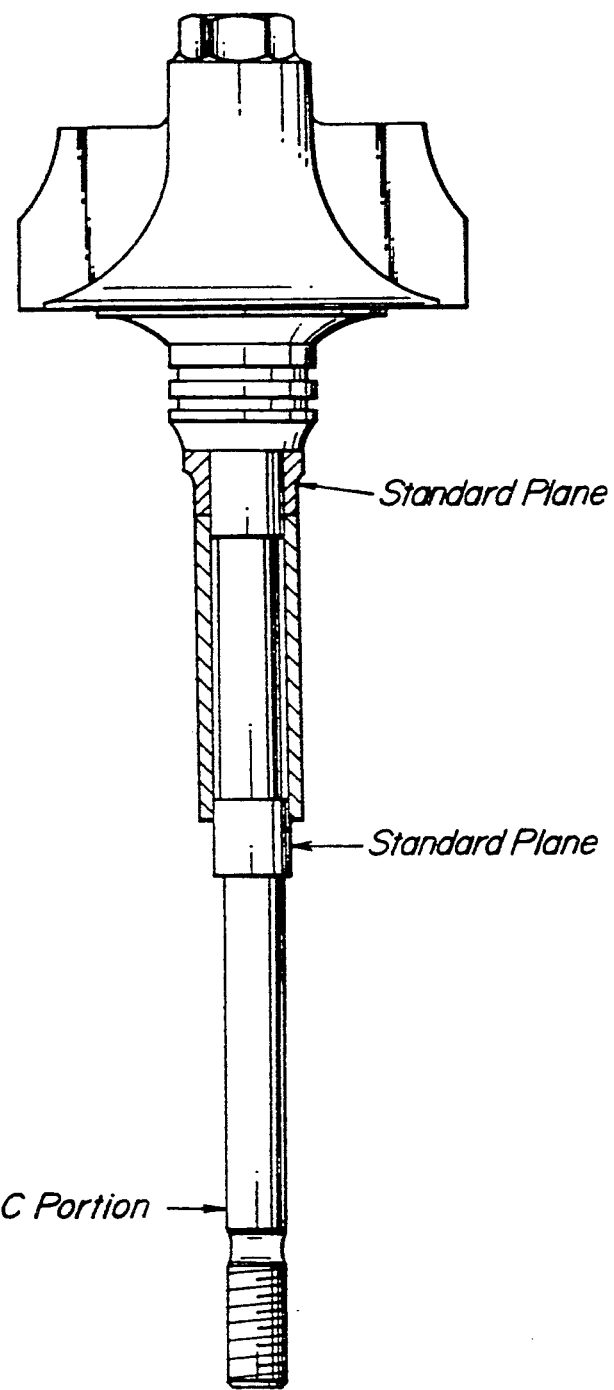

FIG_3a
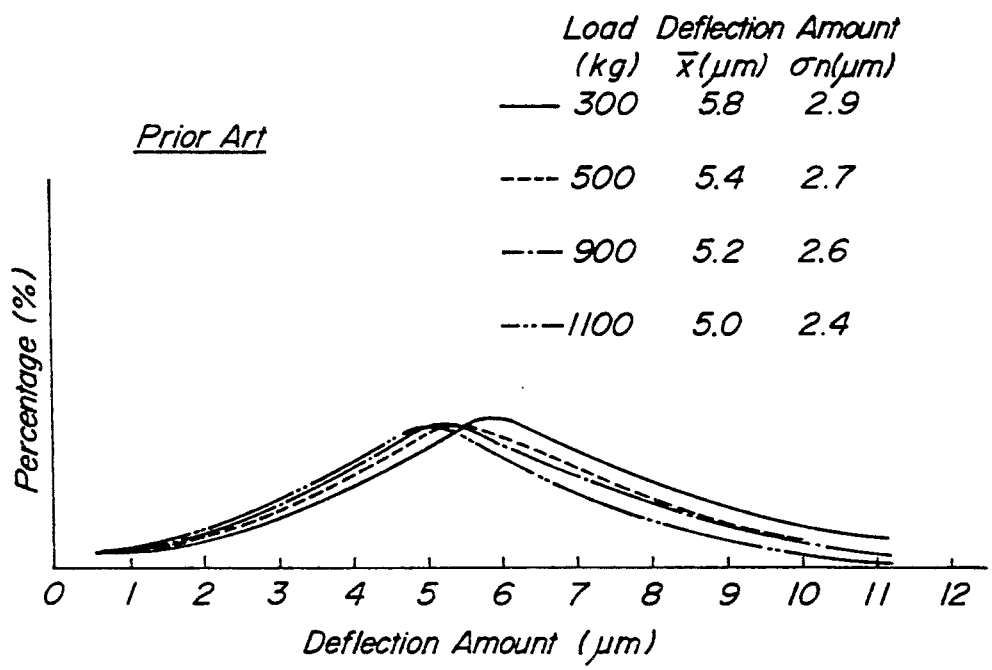
FIG_3b
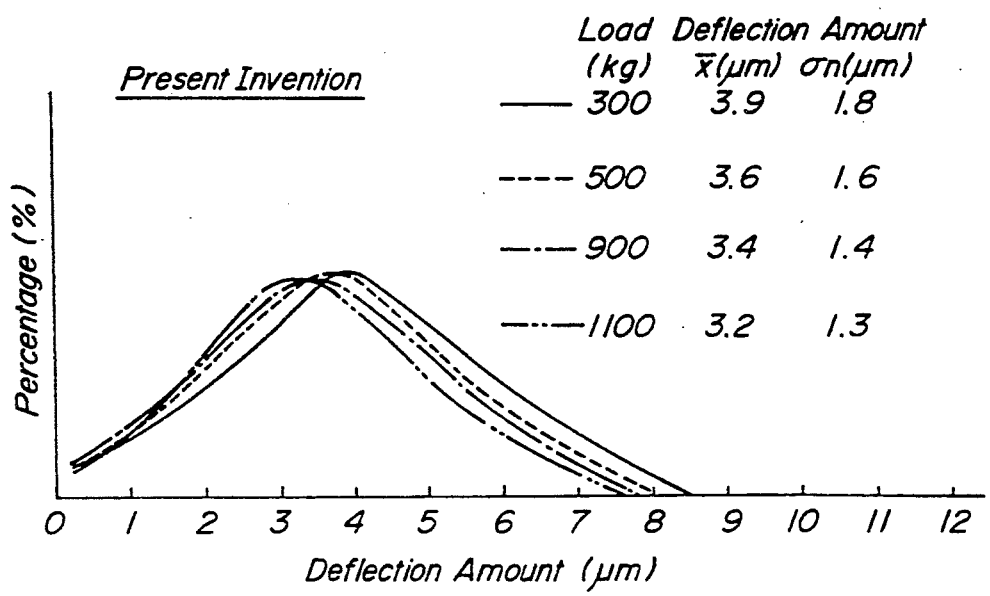

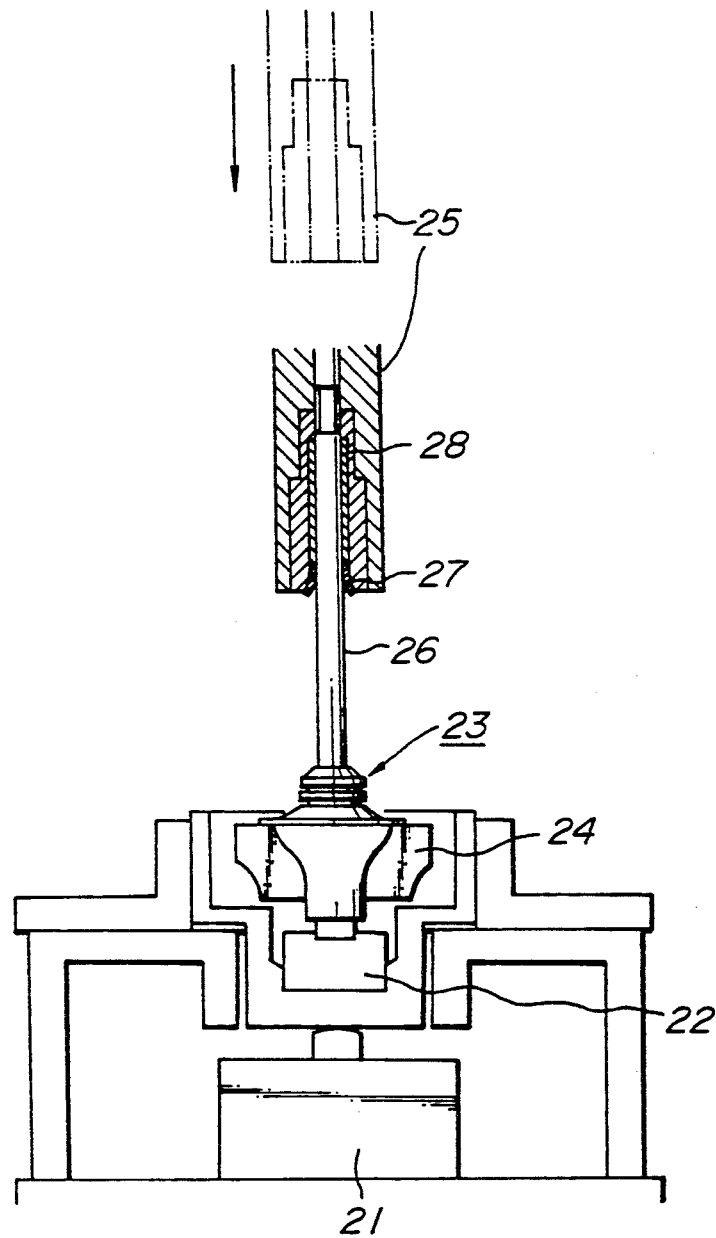
FIG_4
PRIOR ART

METHOD OF MANUFACTURING CERAMIC TURBO CHARGER ROTOR

BACKGROUND OF THE INVENTION

1. Field of the Invention

The present invention relates to a method of manufacturing a ceramic turbo charger rotor of a ball bearing support type in which an inner race of an angular ball bearing and a spacer are integrally secured to a journal portion of a metal shaft.

2. Related Art Statement

Generally, there is known a ceramic turbo charger rotor in which a ceramic turbine rotor and a metal compressor rotor are integrally connected by using a metal shaft. The known ceramic turbo charger rotor is installed in a bearing housing by means of a floating metal support or a ball bearing support.

In the known ceramic turbo charger rotor of the ball bearing support type, use is made of a ceramic turbo charger rotor having a structure such that the inner race of the angular ball bearing and the spacer are integrally secured to the journal portion of the metal shaft, which is used for connecting the ceramic turbine rotor and the metal compressor rotor.

The ceramic turbo charger rotor mentioned above is manufactured in the manner mentioned below. At first, a ceramic member having a wing portion and a shaft portion and a metal member having a journal portion, a compressor shaft portion and a bolt portion are prepared. Then, the ceramic member and the metal member are connected with each other to obtain a joint body, and the joint body is finished to obtain a ceramic-metal joint body. After that, the inner race of the angular ball bearing and the spacer are connected to the journal portion of the ceramic-metal joint body by means of a pressure-insertion method, and a rotation balance thereof is adjusted to obtain a ceramic turbo charger rotor shown in FIG. 2b.

The pressure-insertion operation is performed in the manner described in FIG. 4. As shown in FIG. 4, a tip portion of a ceramic wing portion 24 of a ceramic turbo charger rotor 23 is supported by a support member 22 arranged on a load cell 21. Under such a condition, an inner race 27 and a spacer 28 are pressure-inserted to a journal portion of a metal shaft 26 by using a pressure applying member 25.

Therefore, if an axis of the metal shaft 26 is inclined even slightly, a pressure-insertion condition of the inner race 27 and the spacer 28 is varied in response to an amount of inclination, and thus there often occurs a large deflection of more than 10 $\mu$m during rotation (at the C portion of the metal shaft in FIG. 2b). In this case, prior to an installation of a compressor wheel, an amount of an adjustment of the ceramic turbo charger rotor shown in FIG. 2b becomes larger. Further, after the installation of the compressor wheel, it is necessary to perform a final balance adjustment such that portions of the compressor wheel and/or the nut are cut out. In this case, the compressor shaft, which is bent during the pressure-insertion operation, is stretched back to an original shape, and thus an unbalance amount of the ceramic turbo charger rotor shown in FIG. 2b is varied and increased. Therefore, under some circumstances, it is not possible to reduce a deflection amount during rotation within a predetermined range only by cutting out portions of the compressor wheel and/or the nut, and thus reliability as, for example, car parts is lowered.

SUMMARY OF THE INVENTION

An object of the present invention is to eliminate the drawbacks mentioned above and to provide a method of manufacturing a ceramic turbo charger rotor, which can prevent an affection of a deflection at the C portion of the metal shaft in FIG. 2b generated when an inner race and a spacer are secured to a journal portion of the metal shaft, and which can easily adjust a deflection amount during rotation, generated during a final balance adjustment after a compressor wheel is installed, within a predetermined range. According to the invention, a method of manufacturing a ceramic turbo charger rotor, wherein an inner race of an angular ball bearing and a spacer are integrally secured to a journal portion of a metal shaft for connecting a ceramic turbine rotor and a metal compressor rotor, comprises the steps of:

preparing the ceramic turbine rotor having a wing portion and a shaft portion, the metal shaft having a journal portion, a compressor shaft portion and a bolt portion, and the metal compressor rotor;

connecting the shaft portion of the ceramic turbine rotor and the metal shaft to obtain a ceramic-metal joint body;

applying a tensile load to the metal shaft; and pressure-inserting the inner race and the spacer to the journal portion of the metal shaft.

In the construction mentioned above, as compared with the known method wherein the insertion operation of the inner race and the spacer is performed by supporting a tip portion of the wing portion, since the inner race and the spacer are pressure-inserted to the journal portion of the metal shaft by supporting the bolt portion of the metal shaft to which the metal compressor rotor is connected i.e. a tensile load is applied to the metal shaft, there occurs no partial stress concentration generated when the inner race and the spacer are pressure-inserted by means of the pressure applying member. Therefore, it is possible to keep the deflection amount at the C portion of the metal shaft to less than 10 $\mu$m with respect to the journal axis, and thus a good pressure-insertion condition always can be realized. Moreover, also in the final balance adjustment after the compressor etc. are installed, since the turbo charger rotor prior to the final balance adjustment has a small deflection amount, it is possible to perform easily the final balance adjustment such that the deflection amount during rotation is made within a predetermined range, and thus a highly reliable ceramic turbo charger rotor can be obtained.

BRIEF DESCRIPTION OF THE DRAWINGS

FIGS. 1a and 1b are a front view and a partial side view respectively showing a pressure-insertion operation of a method of manufacturing a ceramic turbo charter rotor according to the invention;

FIG. 2a is an enlarged view of the ceramic turbo charger rotor of the invention.

FIG. 2b is a schematic view illustrating a portion at which a deflection amount during rotation is measured both in the present invention and in the known example;

FIGS. 3a and 3b are graphs depicting the deflection amount at the C portion in FIG. 2b; and FIG. 4 is a schematic view showing the pressure-insertion operation of the known method of manufacturing the ceramic turbo charger rotor.

DESCRIPTION OF THE PREFERRED EMBODIMENTS

Hereinafter, one embodiment of a method of manufacturing a ceramic turbo charger rotor according to the invention will be explained. At first, a ceramic member consisting of a wing portion and a shaft portion and a metal shaft consisting of a journal portion, a compressor shaft portion and a bolt portion are prepared Then the thus prepared ceramic member and metal shaft are connected with each other to obtain a joint body, and the thus obtained joint body is finished to obtain a ceramic-metal joint body. In this case, a deflection amount of the C portion on a journal portion of the metal shaft is controlled to less than 7 μm. Then, the bolt portion of the metal shaft, to which a metal compressor rotor is to be connected later, is supported and the ceramic-metal joint body is pulled down so as to apply a tensile load for the metal shaft. Under such a condition, an inner race of an angular ball bearing and a spacer are pressure-inserted to the journal portion of the metal shaft. After that, a balance control is performed with, respect to the joint body with the inner race and the spacer having a shape shown in FIG. 2b to obtain a ceramic turbo charger rotor.

FIGS. 1a and 1b are schematic views showing a pressure-insertion operation of a method of manufacturing the ceramic turbo charger rotor according to the invention, in which FIG. 1 a illustrates a front view of a whole apparatus and FIG. b depicts a partial side view of a part of the apparatus shown in FIG. 1a. In FIGS. 1a and 1b, 1 is a load cell and 2 is a support member, arranged on the load cell 1, consisting of a lower hold portion 2-1, a support portion 2-2 and an upper hold portion 2-3. Moreover, a pressure apply member 3 comprises a pressure apply portion 3a and a support portion 3b. Further, a ceramic turbo charger rotor 4 comprises a ceramic wing portion 5, a ceramic shaft portion 6 and a metal shaft 10 including a journal portion 7, a compressor shaft portion 8 and a bolt portion 9.

Next, the pressure-insertion operation by using the apparatus shown in FIGS. a and b will be explained. At first, an inner race 11 and a spacer 12 are attached in the support portion 3b of the pressure apply member 3. Then, the support portion 3b is inserted to the compressor shaft portion 8 of the metal shaft 10. Then, the bolt portion 9 of the metal shaft 10 is screwed with a nut portion of the upper hold portion 2-3 of the support member 2 arranged on the load cell 1, and the ceramic-metal joint body is pulled down on the load cell 1 so as to apply a tensile load for the metal shaft 10. Under such a condition, the pressure apply member 3a is moved downward until the pressure apply member 3a is brought into contact with the support portion 3b. In this case, the upper hold portion 2-3 is inserted through a slit 3c into the pressure apply member 3a. The pressure apply member 3a is moved further downward with the support member 3b, thereby the inner race 11 and the spacer 12 are pressure-inserted to the journal portion 7 of the metal shaft 10.

Actually, according to the manufacturing method of the present invention and the known manufacturing method, the ceramic turbo charger rotors were manufactured. In this case, an inner race 11 having a length of 7 mm and a spacer 12 having a length of 38 mm were pressure-inserted to a journal portion 7 having a diameter of 8 mm and a length of 51 mm in a condition such that a clearance of the spacer 12 was 1 to 14 μm and a load of the pressure-insertion operation was 300, 500, 900 or 1000 kg. The spacers used were selected at random from the same lot.

FIG. 2a shows the ceramic turbo charger rotor of the present invention in greater detail. The reference numerals of FIG. 1 are used again in FIG. 2a. FIG. 2a also shows the entire angular ball bearing 13, including inner race 11.

The thus obtained ceramic turbo charger rotors having a shape shown in FIG. 2b were respectively rotated under a condition such that a standard plane thereof was supported. Under such a condition, the deflection amount at the C portion was measured in accordance with various loads by means of a dial gauge. The measured results were displayed on FIGS. 3a and 3b.

From the results shown in FIGS. 3a and 3b, as compared with the ceramic turbo charger rotors manufactured according to the known method, the ceramic turbo charger rotors manufactured according to the method of the present invention consistently showed smaller deflection amounts at all the various loads, and thus it was possible to perform easily the final balance adjustment after the compressor wheel etc. were installed. Moreover, in the final balance adjustment after the compressor wheel etc. were installed, a percentage of the rotors, in which the measured deflection amounts were within a predetermined amount, was 78% on the known manufacturing method shown in FIG. 3a and 100% on the manufacturing method of the present invention. It should be noted that an upper limit of the load is defined by a load at which a plastic deformation of the metal member does not occur.

Further, in order to obtain a turbo charger rotor having a final shape, the compressor rotor was secured to the bolt portion by means of a nut with a screwing torque of 1.0 kg·m (tensile strength applied on the compressor shaft is equivalent to about 900 kg) or a screwing torque of 1.4 kg·m (tensile strength applied on the compressor shaft is equivalent to about 1100 kg). Then a balance control was further performed for the turbo charger rotor. After that a rotation test was performed under conditions of exhaust temperature of 900° C., rotation speed of 130,000 rpm and rotation time of 200 hrs. As a result, all the turbo charger rotors of the present invention were not broken at all.

The present invention is not limited to the embodiments mentioned above, but various modifications are possible. For example, in the embodiments mentioned above, the inner race and the spacer are pressure-inserted to the journal portion of the metal shaft under a condition such that a tensile load is applied to the metal shaft of the ceramic turbo charger rotor, the deflection amount at the C portion of the metal shaft generated due to the pressure-insertion operation can be reduced extremely, and the final balance control after the compressor wheel etc. are installed can be easily performed, so that a highly reliable ceramic turbo charger rotor can be easily obtained.

What is claimed is:

1. A method of manufacturing a ceramic turbo charger rotor, wherein an inner race of an angular ball bearing and a spacer are integrally secured to a journal portion of a metal shaft used for connecting a ceramic turbine rotor and a metal compressor rotor, said method comprising the steps of:

preparing said ceramic turbine rotor having a wing portion and a shaft portion, and said metal shaft having a journal portion, a compressor shaft portion and a bolt portion;

connecting said shaft portion of said ceramic turbine rotor and said metal shaft to obtain a ceramic metal joint body;

applying a tensile load to said metal shaft; and pressure-inserting said inner race and said spacer onto said journal portion of said metal shaft.

2. A method according to claim 1, wherein said pressure-inserting step is performed in such a manner that a rotational deflection amount of said journal portion is less than 10 µm.

3. A method according to claim 1, wherein said pressure-inserting step comprises the steps of:

attaching said inner race and said spacer in a support portion of a pressure applying member;

applying said support portion to said compressor shaft portion of said metal shaft;

supporting said bolt portion of said metal shaft to which said metal compressor rotor is secured;

applying a tensile load to said metal shaft by pulling down said ceramic-metal joint body from said bolt portion; and applying a pressure to said support portion so as to push and position said inner race and said spacer onto said journal portion of said metal shaft.

* * * * *